Jan. 8, 1924.
T. W. CARTER
BELT TIGHTENER
Filed Nov. 23, 1922
1,480,046
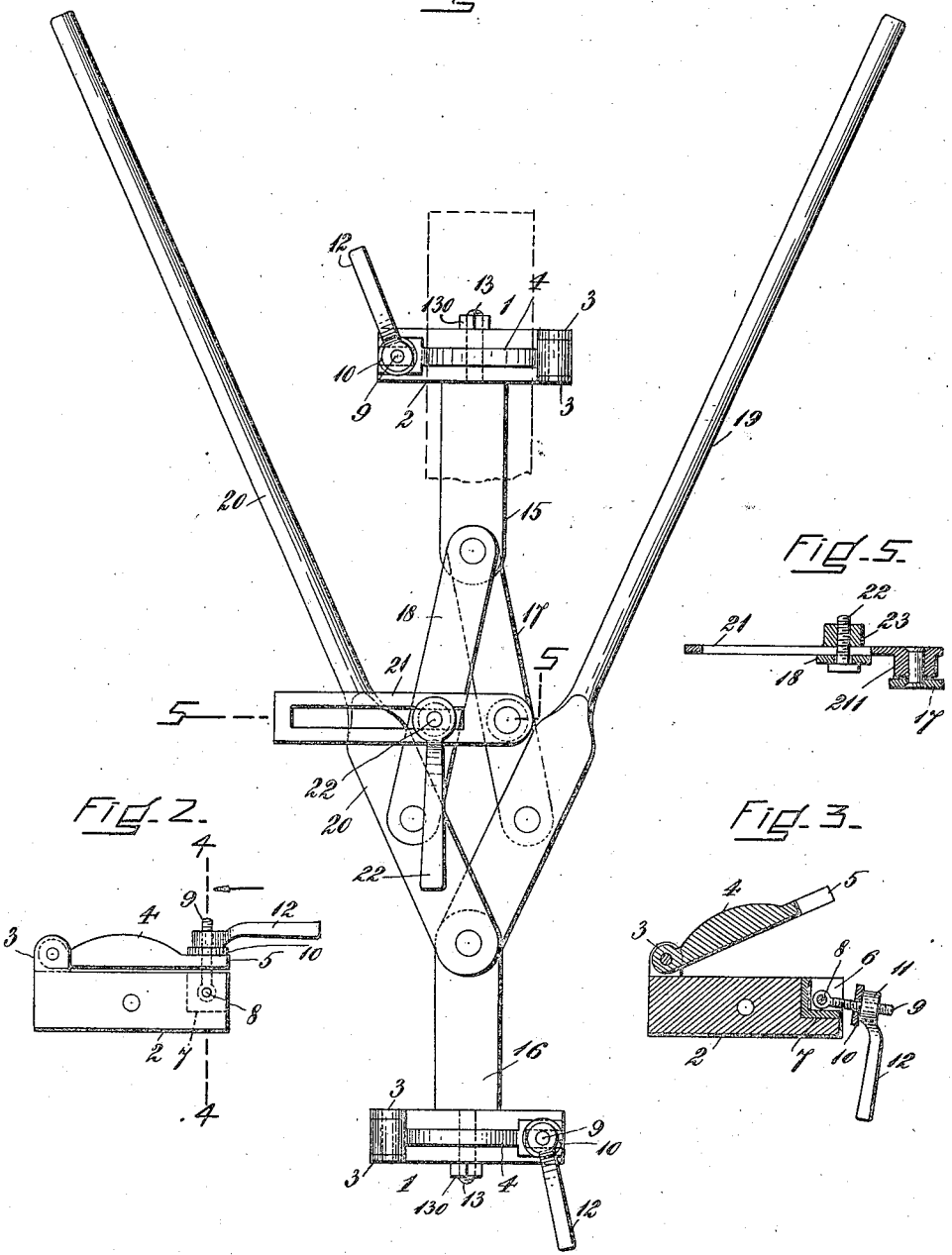

Patented Jan. 8, 1924.

1,480,046

UNITED STATES PATENT OFFICE.

THOMAS WINFIELD CARTER, OF YARMOUTH, NOVA SCOTIA.

BELT TIGHTENER.

Application filed November 23, 1922. Serial No. 602,909.

*To all whom it may concern:*

Be it known that I, THOMAS WINFIELD CARTER, of Yarmouth North, Nova Scotia, a subject of George V, King of England, have invented a new and useful Improvement in Belt Tighteners, of which the following is a specification.

My invention relates to a means for tightening or stretching a belt, and is especially adapted for use when the ends of a belt are to be joined, though it is useful for other purposes. It consists in means attachable to the belt ends and means for pulling the belt ends together and holding them fixedly in position during the joining operation.

My invention will be understood with reference to the drawings in which it is shown in its preferred form.

Figure 1 is a plan of my device.

Fig. 2 is a front elevation of one of the belt clamps.

Fig. 3 is a longitudinal section of the clamp, and

Fig. 4 is a vertical section on line 4—4 of Fig. 2.

Fig. 5 is a vertical section on the line 5—5 of Fig. 1.

1, 1 are the belt clamps each adapted to be attached to an end of a belt.

The clamp comprises a body 2 having lugs 3 between which is hinged the swinging member 4. This swinging member is broadened and forked at its free end as at 5. The body member 4 is recessed as at 6, its recess being preferably provided with a lining 7. Within the lining is hinged the clamping member by the pin 8. The clamping member comprises a screw 9 enlarged at its hinged end and perforated to receive the hinge pin 8, this passing also through the body 2 and lining 7. At its upper end the screw 9 carries a washer 10 and a retaining nut 11 which is preferably provided with a handle 12 by which the nut may be easily manipulated. The body 2 is also provided with a hole through which passes the threaded shank 13 of a holder 15, 16, 130 being a nut which screws onto the shank 13 and clamps together the holder and the body 2.

The clamps are attached to the ends of the belt. The holder 15 has pivotally connected to its outer end arms 17 and 18. The outer end of arm 17 is pivotally connected to one of the levers 19, the arm 18 being similarly connected to the other lever 20, one end of each of the levers 19, 20 being pivotally connected to the outer end of the holder 16. A slotted adjusting arm 21 having a hub 211 is pivoted to the arm 17 and reaches over the arm 18 and may be clamped thereto by a screw 22 which projects up through the arm 18 and the slot in the arm 21. A handled nut 23 screws onto the screw 22 so that it may bind the arms 18 and 21 in any desired position.

My device is operated as follows: The belt clamps are opened as in Fig. 3 and an end of the belt is placed in each clamp between the swinging member and the body, after which the swinging member is closed down against the belt and the clamping member is swung up so that the washer 10 rests on the fork of the swinging member (see Fig. 2). Th outer ends of the levers 19 and 20 are then separated (the nut 23 being first loosened) as far as possible so as to draw up the clamp, pulling the belt ends together as far as possible, and the nut 23 is then screwed down so that the adjusting arm is firmly clamped against the arm 18, thus holding the arms 17 and 18 in extended position, and the clamps and belt ends in close proximity so that the ends of the belt are free to be worked upon without strain, the clamps being placed as far from the extreme ends of the belt as circumstances require and allow.

When the work on the belt ends is finished, for example, when they are laced or otherwise connected together, the adjusting arm 21 is released, and the belt is released from the clamps.

It will be seen that by means of a device embodying my invention the two ends of a belt may be adjusted about pulleys and the ends laced or otherwise attached together so that this tension is maintained after the device is removed. It will also be seen that my invention may be otherwise embodied. By the word "clamp" I mean to include any means for holding the belt ends.

What I claim as my invention is:—

1. A device of the kind described having two clamping means, a pair of levers pivotally connected to one of said clamping means, and links connecting said levers to the other clamping means, whereby a movement of said levers will cause said clamps to approach.

2. A device of the kind described having two clamping means, a pair of levers pivotally connected to one of said clamping means, links connecting said levers to the other clamping means, whereby a movement of said levers will cause said clamps to approach, and means for locking said levers whereby said clamps will be maintained in fixed position.

THOMAS WINFIELD CARTER.